United States Patent [19]

Becnel

[11] Patent Number: 4,535,545
[45] Date of Patent: Aug. 20, 1985

[54] INSPECTION DEVICE AND METHOD FOR CYLINDRICAL WORK PIECES

[75] Inventor: Larry H. Becnel, West Covina, Calif.

[73] Assignee: General Dynamics, Pomona Division, Pomona, Calif.

[21] Appl. No.: 554,036

[22] Filed: Nov. 21, 1983

[51] Int. Cl.³ .............................................. A61B 5/08
[52] U.S. Cl. ...................................... 33/550; 33/509; 33/573
[58] Field of Search ............ 33/174 Q, 169 R, 178 D, 33/174 F, 174 P, 199 R

[56]  References Cited

U.S. PATENT DOCUMENTS

| 2,470,404 | 5/1949 | Kloos | 33/174 Q |
| 2,501,130 | 3/1950 | Kuppersmith | 33/178 R |
| 2,668,362 | 2/1954 | Johnson | 33/178 R |
| 2,696,675 | 12/1954 | Case | 33/178 R |
| 2,770,050 | 11/1956 | Johnson | 33/199 |
| 2,785,474 | 3/1957 | Mages et al. | 33/174 Q |
| 3,065,549 | 11/1962 | Antoszewski et al. | 33/178 R |
| 3,104,472 | 9/1963 | Eppler | 33/178 R |
| 3,169,323 | 2/1965 | Hold | 33/147 |
| 3,195,240 | 7/1965 | Parker | 33/180 R |
| 3,264,631 | 8/1966 | Ege | 340/259 |
| 3,639,996 | 2/1972 | Johnson | 33/199 R |
| 3,751,812 | 8/1973 | Meyer | 33/178 R |
| 3,871,106 | 3/1975 | Hegenbart | 33/178 R |
| 3,872,599 | 3/1975 | Vandre | 33/174 R |
| 3,911,586 | 10/1975 | Malonda | 33/174 Q |
| 4,240,206 | 12/1980 | Baresh et al. | 33/174 Q |

FOREIGN PATENT DOCUMENTS 2829000 1/1980 Fed. Rep. of Germany.
485302 12/1975 U.S.S.R.

Primary Examiner—Willis Little
Attorney, Agent, or Firm—Henry M. Bissell; Edward B. Johnson

[57] ABSTRACT

A holding fixture and method for using the same are disclosed which enable great accuracy in performing measurements of concentricity, diameter, and wall thickness of a cylindrical workpiece. The present invention supports the workpiece for rotation at two fixed locations characterized by orthogonal tangents, while making measurements at a location on the workpiece on the opposite side of one of the support locations. The device is simple and economical in construction, easy to use while providing reliable measurements of the specified parameters, and it improves production line operation by expediting particular measuring procedures.

39 Claims, 3 Drawing Figures

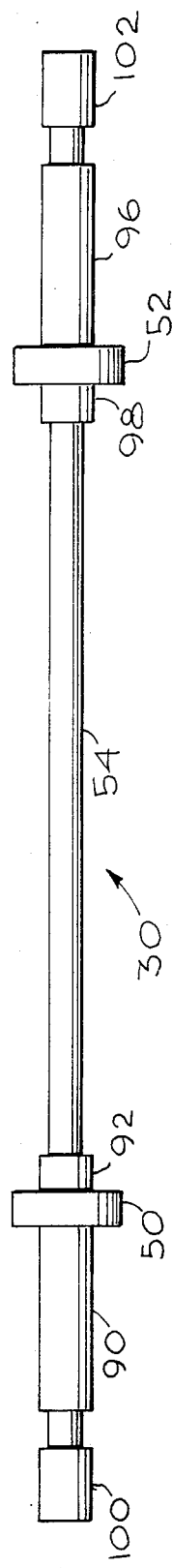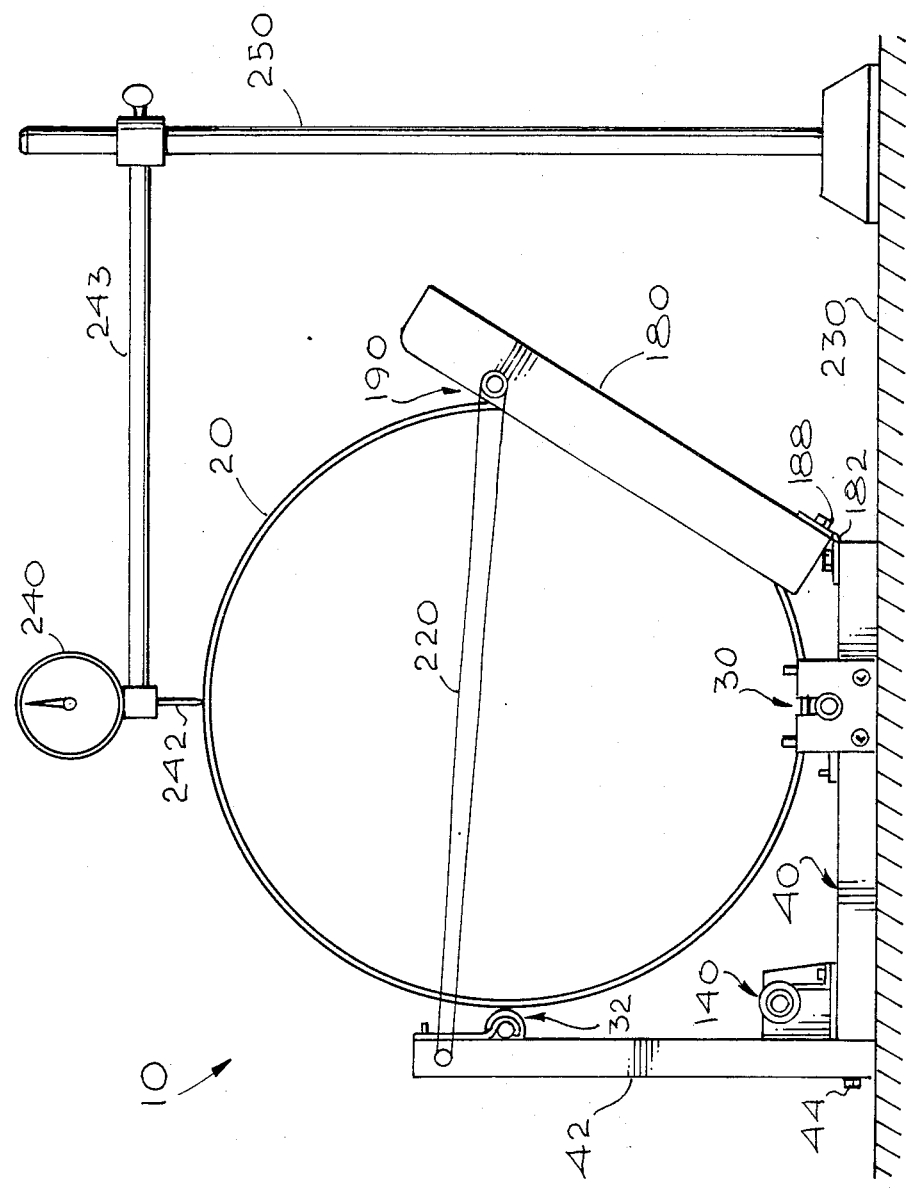

INSPECTION DEVICE AND METHOD FOR CYLINDRICAL WORK PIECES

The Government has rights in this invention pursuant tp Contract No. N00019-81-C-0468, awarded by the United States Navy.

BACKGROUND OF THE INVENTION

1. Field of the Invention

This invention relates generally to a device for checking the roundness of a cylindrical workpiece, more specifically to a holding fixture for rotatably supporting a cylindrical segment such as a missile tube portion so that the critical dimensions of the cylindrical segment may be inspected.

2. Description of the Prior Art

The manufacture of high technology devices frequently imposes the requirement that in the construction of such devices great care be taken to ensure adherence to critical tolerance requirements. Failure to closely inspect components during the manufacturing process may result in rejection of assemblies, costly reworking of components, delays in production, or critical failures in operation of the device. Nowhere are such critical tolerance requirements more important than in aerospace and defense applications such as missile and rocket assemblies.

As an example, missiles may be constructed from several segments which are welded together. One such segment is a spacer segment, which is a cylindrical tube separating the surface control section of a missile from other sections containing the guidance, propulsion, and warhead portions of the missile. The spacer section is constructed from flat stock by rolling the metal into a tube and welding the adjacent edges together, thus forming a cylindrical tube. Since the spacer section is made of fairly thin metal to keep weight to a minimum, when it is welded to an adjoining cylindrical segment it is critical that both segments be concentric and have the same diameter.

Typically, both segments are machined prior to welding so that when adjacent segments abut, a V-shaped channel is formed into which the welded bead may be laid. After the segments are welded together, the weld is then machined flat with the inner surfaces of the segments.

It can therefore be seen that if one or both of the segments are not concentric or of the required diameter, the segments will not abut properly, resulting in the machining operation removing a portion of the wall thickness of one of the segments. Thus, the structural integrity of the assembly will be degraded, and the assembly must then be rejected.

It is thus apparent that the cylindrical segments used in the missile housing must adhere to critical tolerances, and in order to avoid defective assemblies careful inspection of the housing components such as the spacer section must take place before the sections are welded together. Inspection of the cylindrical housing segments, which are typically around 8 inches in diameter, has in the past been performed on an inspection surface plate, which is made of perfectly flat and polished rock. Using a dial indicator mounted on a stand resting on the surface plate, the inspector had to rotate the housing segment by hand while reading the dial indicator. It is evident that such an operation is rather difficult and time consuming, as well as presenting the possibility of somewhat less than complete accuracy.

A number of devices exist in the general subject area of gaging or measuring the outer perimeter of circular or curved elements. One such device is illustrated in U.S. Pat. No. 3,751,812 to Meyer. The Meyer device, which is used to measure the ovality of an out-of-round device, is unsuitable for checking the concentricity of a cylindrical tube. This limitation exists because the Meyer device does not support the workpiece on a plurality of support points having tangents which are orthogonal axes, thereby alowing the workpiece to be rotated with respect to these fixed support points and measured for concentricity with respect to the axes. Rather, Meyer uses a pivotably mounted jaw and a single fixed support point, thereby allowing substantially out-of-round articles to be supported, and rendering impossible a measurement of concentricity, or even a measurement of diameter sufficiently accurate to ensure the adherence to critical dimensional tolerances required by the missile spacer section described above.

Another such device is described in U.S.S.R. Inventor Certificate No. 485,302, which is a device for checking the mean diameter of the races of ball bearings. This device drives a dial indicator through contacts at two orthogonal tangential positions on the ball bearing to obtain a mean diameter of the race of the bearing being measured. Unfortunately, such an approach is useless for the present application since a first surface defect at one location being measured combined with a second surface defect at the second location being simultaneously measured may result in the dial indicator presenting absolutely no indication of either defect. It is thus possible that a workpiece having a perfect elliptical shape would present an identical reading on the dial indicator with a workpiece having a perfectly round shape.

A variety of other devices for measuring circular or cylindrical workpieces is known in the prior art, as exemplified by U.S. Pat. Nos. 2,501,130 of Kuppersmith, 2,668,362 of P. W. Johnson, 2,696,675 of Case, 2,770,050 of S. G. Johnson, 3,065,549 of Antoszewski et al, 3,104,472 of Eppler, 3,169,323 of Hold and 3,871,106 of Hegenbart, and by German Pat. No. 2,829,000. All of the identified devices are of relatively intricate construction often requiring elaborate set-up procedures which, unless rigorously adhered to, inherently lead to errors in the measurements made by the device. Many of the known devices are adjustable to accommodate workpieces of differing dimensions, thereby further complicating the construction and the set-up procedures which are required.

The need served by the present invention involves quickly and reliably taking the measurement of concentricity about the circumference of a thin-walled cylindrical workpiece of one particular diameter. The measurement is to be made at each end of the cylindrical workpiece. The workpieces may be of different lengths, but the diameter is the same. For efficiency in operation, the holding fixture must permit a workpiece to be quickly and easily located within the fixture at a precise reference position, rapidly rotated therein while the measurements of concentricity are made, and as quickly and easily removed to make way for the next workpiece. The holding fixture of the invention avoids the above-described disadvantages of the Meyer device and the Russian device, while allowing the cylindrical spacer section to be quickly, easily and conveniently rotated and measured to determine whether or not the part is concentric, and of the desired diameter. It is also desirable that the device be provided without exhorbitant cost, so the holding fixture must be of relatively simple and economic construction.

SUMMARY OF THE INVENTION

The present invention includes a holding fixture which may be placed on an inspection surface plate adjacent to a stand holding the dial indicator used to inspect the workpiece. The holding device is specifically designed for cylindrical workpieces having a predetermined outer diameter, although the length of the workpiece may vary. The holding device supports the workpiece at two orthogonal tangential locations on the outer diameter of the workpiece with roller bearings which are mounted in a fixed position.

Lower bearing support carries the workpiece at both ends and the bottom of the workpiece. A side bearing support carries the side of the workpiece at a position 90° away from the lower bearing support at the bottom of the workpiece. The lower bearing support and the side bearing support are fixedly supported by the holding fixture to maintain their relative positions with respect to the workpiece.

A restraining bearing support is mounted in hinged fashion to the holding device to maintain the workpiece on the lower bearing support and the side bearing support. The restraining bearing support is urged against the workpiece by biasing means. The workpiece rotates freely in the holding fixture on the bearing supports.

A dial indicator, which has been set with respect to the height of the lower bearing support, is used to obtain readings from the top of the workpiece directly opposite the location at which the lower bearing support carries the workpiece at the bottom of the workpiece. By mounting the workpiece with respect to the fixed lower and side bearing supports and reading the gage at a point directly opposite the lower bearing support a precise reading may be obtained of the diameter of the workpiece at that location.

The workpiece may then be rotated manually on the bearing support to check the diameter around the periphery of the workpiece to ensure that the concentricity and predetermined diameter dimensions are met by the workpiece being checked. It can be seen that it will only take seconds to rotate the workpiece while watching the dial indicator, thus making the inspection operation much easier and more simple than in the past. After one end of the workpiece has been checked in this fashion, the holding fixture is opened sufficiently to permit removal of the workpiece, which is lifted out and turned end-for-end, after which it is re-inserted in the holding fixture. The fixture is then closed and the inspection procedure repeated for the other end of the workpiece.

In addition, since the measurement is being obtained with respect to two fixed supports for the workpiece and at a point directly opposite one of the fixed supports, the accuracy of the reading will be consistently high. Thus, it may seen that the present invention, while of fairly simple and inexpensive construction, renders possible a quick yet thorough and accurate inspection of tubular segments for use in close tolerance applications.

Since the measurement is being made with respect to the lower bearing support, which supports the tubular section at the ends of the section, in a further embodiment of the present invention the lower bearing support is made replaceable to allow tubular segments of different lengths to be quickly and accurately inspected in a single holding fixture by merely using alternative lower bearing supports. The present invention thus provides a substantial improvement in making inspections of the concentricity and diameter of tubular cylindrical segments of a predetermined diameter, and additionally allows the wall thickness of the cylindrical segment to be checked. The holding fixture of the present invention is inexpensive and highly portable, since it may be moved from one inspection surface plate to another at will. A high rejection rate of the workpieces is thus avoided, due to the precise nature of measurement made possible by the present invention.

DESCRIPTION OF THE DRAWINGS

A better understanding of the present invention may be had from a consideration of the following detailed description, taken in conjunction with the accompanying drawings in which:

FIG. 2 is a plan view of one of the sets of lower bearing supports illustrated in the holding fixture shown in FIG. 1; and FIG. 3 is a side view of the present invention including the holding fixture of FIG. 1 as it is used in inspecting a cylindrical segment for concentricity and diameter.

DETAILED DESCRIPTION OF THE PREFERRED EMBODIMENT

Figure 1:
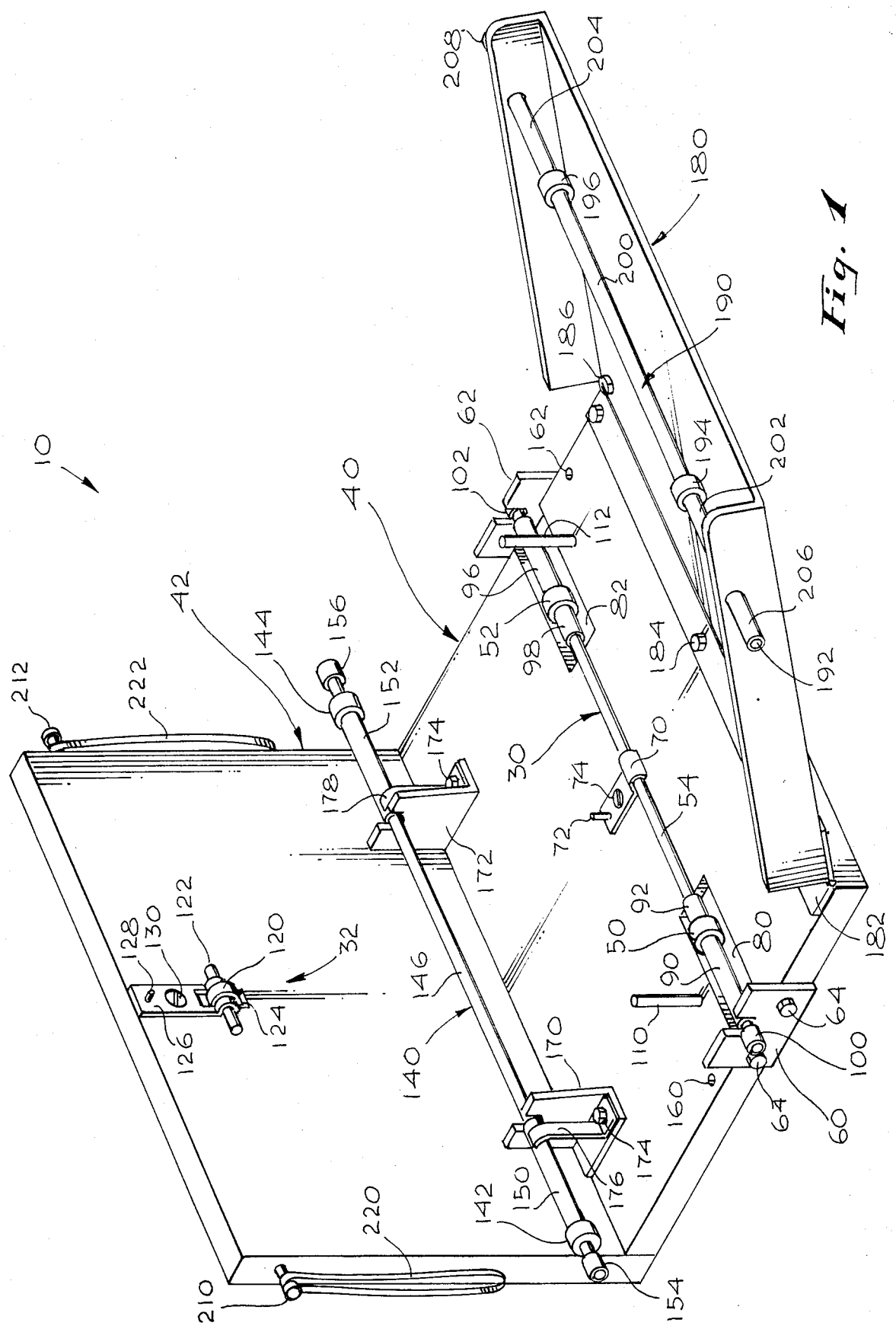
FIG. 1 is a perspective view of the holding device of the present invention, including interchangeable lower bearing supports to accommodate various tube lengths.

It is a feature of the present invention to rotatably support a cylindrical workpiece by axially aligned elements making line contact at two fixed reference locations on the cylindrical workpiece, the locations on the workpiece being characterized by the relationship that tangential lines drawn from the two locations are orthogonal. Looked at in another way, the lines of contact with the workpiece at the reference locations lie on orthogonal diameters of the cylindrical workpiece. Thus, the holding fixture 10 shown in detail in FIG. 1 is used to hold a cylindrical segment 20 as shown in FIG. 3, with a lower bearing support 30 and a side bearing support 32 supporting the cylindrical segment 20 for rotation in a fixed position with respect to the holding fixture 10.

The construction of the holding fixture 10, best illustrated in FIG. 1, is therefore directed toward providing the lower bearing support 30 and the side bearing support 32 in a geometrically fixed relationship to allow the desired measurements to be taken precisely in a simple, convenient manner. The holding fixture 10 consists of a perfectly flat lower support plate 40, to which an orthogonal side support plate 42 is rigidly attached with a number of bolts 44 (FIG. 3).

The lower bearing support 30, shown in FIGS. 1 and 2, is designed to carry the bottom of the workpiece, and consists of two bearings 50, 52 which are rotatably mounted on the axle 54. The axle 54 is supported in the center by the lower support plate 40, and at its ends by two axle support brwackets 60, 62, which are attached to the lower support plate by a number of bolts 64. It should be noted that the axle support brackets 60, 62 are attached to the lower support plate 40 so that the notches in the axle support brackets 60, 62 in which the axle 54 rests are coplanar with the top of the lower support plate 40 on which the center portion of the axle 54 rests.

The axle 54 is retained in place by an axle retaining arm 70 which is attached to the lower support plate 40 by a pin 72 and a screw 74, so that the lower bearing support 30 may be quickly and conveniently removed by unscrewing the screw 74.

The lower support plate 40, shown in FIG. 1, contains two recessed apertures 80, 82 in which the bearings 50, 52 are partially situated. The apertures 80, 82 are contained in the lower support plate 40 in order to both allow the bearings 50, 52 to turn freely and to allow the hardware axially restraining the bearings 50, 52 to be mounted on the axle 54 without influencing the mounting of the axle 54 in the axle support brackets 60, 62 and on top of the lower support bracket 40.

The bearing 50 is held in place on the axle 54 by a first piece of tubing 90 between the axle support bracket and the bearing 50 and by a second piece of tubing 92 on the side of the bearing 50 opposite the tubing 90, as shown in FIGS. 1 and 2. All of the tubing used on the axles is interference fitted onto the axles to prevent axial movement of the bearings. In a similar manner, the bearing 52 is held in place by a first segment of tubing 96 between the bearing 52 and the axle support bracket 62 and by a second piece of tubing 98 on the side of the bearing 52 opposite the tubing 96.

The axle 54 is restrained from axial movement by an additional piece of tubing 100 on the axle outside of the axle support bracket 60, and an additional piece of tubing 102 on the axle 54 outside of the axle support bracket 62. Thus, it may be seen that the lower bearing support 30 is fixedly mounted on the lower support plate 40 in a manner allowing the bearings 50, 52 to turn freely, and additionally situating the bearings 50, 52 in specific, unique positions relative to the lower support plate 40.

The workpiece, which will rest on the bearings 50, 52, must also be restrained from axial movement to ensure that the bearings 50, 52 support the workpiece near the ends of the workpiece, since the dimensions of the workpiece which are most critical are those at the ends of the workpiece. Therefore, two guide pins 110, 112, best shown in FIG. 1, are removably mounted in the lower support plate 40 to prevent axial movement of the workpiece as it is supported on the bearings 50, 52.

The second geometrically fixed support point for the workpiece is supplied by the side bearing support 32, located on the side support plate 42. In the preferred embodiment, only a single bearing 120 is used in the side bearing support 32, although dual bearings may in fact be used. The reason for using a single bearing 120 instead of dual bearings will become evident later.

The bearing 120 is rotatably mounted on an axle 122, and turns freely since it is partially located in an aperture 124 located in the side support plate 42. The axle 122 is held in its desired position fixedly by an axle retaining arm 126, which is secured by a pin 128 and a screw 130. The axle retaining arm 126 also prevents lateral movement of the bearing 120 on the axle 122.

It may therefore be appreciated that the cylindrical segment 20 will be rotatably supported by the lower bearing support 30 and the side bearing support 32 in the manner illustrated in FIG. 3, with the points on the cylindrical segment 20 at which the bearings 50, 52 contact the cylindrical segment 20 and the point at which the bearing 120 contacts the cylindrical segment 20 being related by the fact that they have orthogonal tangents. The support points on the cylindrical workpiece are therefore angularly 90° apart.

Returning to FIG. 1, it is a stated objective of the present invention to allow workpieces of different lengths to be inspected in a single holding fixture 10. Although the outside diameter of the workpiece to be inspected is fixed by the mounting positions of the lower bearing support 30 and the side bearing support 32 due to the fact that orthogonal tangents are required at the points the lower bearing support 30 and the side bearing support 32 intersect the workpiece, workpieces having varying lengths may be inspected in the same holding fixture 10 by merely substituting an alternate lower bearing support 140 for the lower bearing support 30, and by moving the guide pins 110, 112 to different locations in the lower support plate 40.

The alternate lower bearing support 140 depicted in FIG. 1 is similar to the lower bearing support 30, but has two bearings 142, 144 mounted with a wider spacing on an axle 146 to accommodate a longer workpiece than that used with the lower bearing support 30. The alternate lower bearing support 140 shown in FIG. 1 is set up to provide for a maximum length workpiece, since when the alternate lower bearing support 140 is installed the bearing 142 will be adjacent the axle support bracket 60, and the bearing 144 will be adjacent the axle support bracket 62. Therefore, only one piece of tubing 150 is located adjacent the bearing 142 to prevent movement inward, and one piece of tubing 152 is located adjacent the bearing 144 to prevent movement inward. A piece of tubing 154 is provided on one end of the axle 146 to prevent axial movement of the axle 146 with respect to the axle support bracket 60, and a piece of tubing 156 is provided on the opposite end of the axle 146 to prevent axial movement of the axle 146 with respect to the axle support bracket 62.

In addition, alternate guide pin holes 160, 162 are provided in the lower support plate 40 to accommodate a longer workpiece to be inspected using the alternate lower bearing support 140. The guide pin 110 may thusly be mounted in the alternate guide pin hole 160, and the guide pin 112 may be mounted in the alternate guide pin hole 162.

When the alternate lower bearing support 140 is not in use, it is mounted in a pair of brackets 170, 172 in a location which will not interfere with the workpiece being inspected. The brackets 170, 172 are mounted on the lower support plate 40 by bolts 174, which also are used to hold a pair of flexible retaining arms 176, 178 which are used to hold the alternate lower bearing support 140 in the brackets 170, 172, respectively.

The reason that the side bearing support 32 includes only a single bearing 120 instead of dual bearings is now apparent. Since lower bearing supports of different length will be used, and since the measurements will be made with respect to the lower bearing support, multiple bearings in the side bearing support are unnecessary.

While it can be seen that a workpiece will be rotatably supported on the lower bearing support 30 and the side bearing support 32, it will also be appreciated that the workpiece will have a tendency to roll off of the lower bearing support 30 in a direction away from the side bearing support 32. Therefore, a restraining means is provided for holding the workpiece in the desired position on the lower bearing support 30 and against the side bearing support 32. The workpiece is kept against the lower bearing support 30 and the side bearing support 32 by a floating back 180, which is attached to the lower support plate 40 by a hinge 182 at the side of the lower support plate 40 opposite the side support plate 42. The hinge 182 is attached to the lower support plate 40 by a number of bolts 184, and the floating back 180 is attached to the hinge 182 by a number of bolts 186 and nuts 188 (FIG. 3).

The floating back 180 carries a restraining bearing support 190 to urge the workpiece in a direction predominantly toward the side bearing support 32. The restraining bearing support 190 consists of an axle 192 containing two bearings 194, 196 rotatably mounted on the axle 192. The axle extends through the side portions of the floating back 180, and contains a number of pieces of tubing to hold the bearings 194, 196 and the axle 192 in place. The bearings 194, 196 are separated by a piece of tubing 200. The bearing 194 is also restrained by a piece of tubing 202 between the bearing 194 and the side of the floating back 180. The bearing 196 is also held in place by a piece of tubing 204 between the opposite side of the floating back and the bearing 196. In addition, two pieces of tubing 206, 208 are used on the outside ends of the axle 192 to restrain the axle 192 from axial movement with respect to the floating back 180.

The construction of the holding fixture 10 is completed by two bolts 210, 121 which are mounted in the side support plate 42 at the top and outer edges of the side support plate 42. Suspended from each of the bolts 210, 212 are elastic bands 220, 222, respectively. The ends of the elastic bands 220, 222 not attached to the bolts 210, 212, respectively, will be attached over the tubing sections 206, 208, respectively, to urge the floating back 180 inward and the restraining bearing support 190 into contact with the workpiece, to ensure that the workpiece remains supported on the lower bearing support 30 and the side bearing support 32.

The operation of the invention may now be described with a cylindrical segment 20 installed in the holding fixture 10. As shown in FIG. 3, the floating back 180 and the restraining bearing support 190 carried by the floating back 180 are urged toward the cylindrical segment 20 by the elastic bands 220, 222. At this point, it may be noted that the restraining bearing support 190 contacts the cylindrical segment 20 at a location above the point at which the side bearing support 32 contacts the cylindrical segment 20. This location is arbitrary, and may be any location at or above the corresponding point at which the side bearing support 32 contacts the cylindrical segment 20.

The holding fixture 10 containing the cylindrical segment 20 to be inspected is positioned on a flat ground plane 230. A dial indicator 240 is held with a follower tip 242 in contact with the cylindrical segment 20 at a point exactly opposite the point at which the cylindrical segment 20 is supported by the bearing 50 (FIG. 1) on the lower bearing support 30. The dial indicator 240 is fixedly supported above the ground plane 230 by a support stand 250 having a base positioned on the ground plane 230.

The follower tip 242 of the dial indicator 240 is in contact with the top of the cylindrical segment 20 at the critical location, which is the point on the cylindrical segment 20 immediately adjacent the edge of the cylindrical segment 20 (the location at which the butt weld to an adjacent segment is to be made). Since the cylindrical segment 20 is supported by the lower bearing support 30 at a location on the cylindrical segment 20 adjacent the edge of the cylindrical segment 20, it is apparent that measurements obtained on the dial indicator 240 indicating deviation from perfect roundness (concentricity) will be extremely accurate and true. The cylindrical segment 20 may then be rotated by hand to check for deviations from the initial reading on the dial indicator 240. If this measurement indicates that any deviation from concentricity of the cylindrical segment 20 is excessive, the cylindrical segment 20 is discarded before further machining and welding operations take place.

A second measurement which may be obtained using the present invention is diameter of the cylindrical segment 20. In order to check the diameter of the cylindrical segment 20, the dial indicator 240 may be set to zero when the horizontal arm 243 is fixed at the proper height above the ground plane 230 (as determined, for example, by the use of a jig corresponding to the appropriate distance). The cylindrical segment 20 would then be placed in the holding fixture as described above, and the diameter may then be read with the dial indicator 240. Thickness of the cylindrical segment 20 may be read in a similar fashion, with the follower tip 242 being placed on the inside of the cylindrical segment 20 immediately above the bearing 50 (FIG. 1) of the lower bearing support 30.

It may therefore be appreciated that the present invention allows for extremely precise measurements to be made in a simple, quick, economical manner. The present invention may be used to check concentricity, diameter, and wall thickness of the cylindrical segment 20 being checked. In this manner, defective workpieces may be removed from the assembly line before more labor-intensive operations are performed on them, saving considerable time and money as well as preventing defective assemblies. The present invention thus presents substantial advantages over known devices and methods, while embodying no disadvantages other than the rather minimal cost of constructing the holding fixture 10. It may thus be seen that the present invention is a highly desirable alternative to existing methods and devices, providing a high degree of accuracy and speed of inspection at a minimal cost.

Although there have been described above specific arrangements of an inspection device and method for cylindrical work pieces in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A device for checking the concentricity of a cylindrical workpiece, comprising:

first reference support means for rotatably supporting said workpiece at a first location on the outer perimeter of said workpiece, said first reference support means establishing a fixed reference point from which a measurement of the diameter of said workpiece may be taken as said workpiece is rotated to determine the concentricity of said workpiece;

second reference support means for rotatably supporting said workpiece at a second location on the outer perimeter of said workpiece, said second location being defined by a tangent to said workpiece orthogonal to the tangent to said workpiece at said first location, said second reference support means maintaining said workpiece to allow said measurement of the diameter of said workpiece to be taken;

a base member rigidly mounting the first and second reference support means at said first and second locations, respectively; and biasing means hingedly attached to the base member for removably maintaining said workpiece in contact with said first and second reference support means.

2. A device as defined in claim 1, wherein said first reference support means comprises:

a rotatable wheel upon which said workpiece may rotate, said first location being the intersection of said workpiece and said rotatable wheel, said first location defining said fixed reference point, the diameter of said workpiece being measured from said fixed reference point at said first location to a third location on the opposite side of the outer perimeter of said workpiece from said first location.

3. A device as defined in claim 2, wherein said rotatable wheel comprises:

a bearing mounted on an axle.

4. A device as defined in claim 2, said first reference support means additionally comprising:

at least one additional rotatable wheel upon which said workpiece may rotate.

5. A device as defined in claim 2, wherein said rotatable wheel carries said workpiece near one end of said workpiece, thereby establishing said fixed reference point near said one end of said workpiece.

6. A device as defined in claim 1, the base member comprising:

a frame, said frame having mounted thereupon said first and second reference support means, said frame allowing the free rotation of said workpiece upon said first and second reference support means.

7. A device as defined in claim 6, further comprising:

at least one guide pin mounted in said frame to maintain the axial position of said workpiece with respect to said first reference support means.

8. A device as defined in claim 7, wherein said guide pin is movable to accommodate cylindrical workpieces of different length.

9. A device as defined in claim 6, wherein said biasing means comprises:

a floating support structure hinged to said frame for relative movement with respect to said frame;

at least one wheel rotatably mounted in said support structure, said wheel contacting said workpiece to maintain said workpiece on said first and second reference support means when said support structure is urged in a closing direction; and means for urging said support structure in said closing direction.

10. A device as defined in claim 9, wherein said urging means comprises:

at least one elastic band connected between said frame and said floating support structure.

11. A device as defined in claim 6 wherein said frame is machined flat for placement on a flat surface plate to establish said fixed reference point.

12. A device as defined in claim 6, wherein said frame includes means for receiving said first reference support means, said receiving means allowing for removal and replacement of said first reference support means.

13. A device as defined in claim 1, wherein said first reference support means is designed to accommodate a workpiece of a single length, further comprising:

at least one additional reference support means interchangeable with said first reference support means to accommodate a workpiece of a different length than that accommodated by said first reference support means.

14. A device as defined in claim 1, wherein said second reference support means comprises:

a rotatable wheel against which said workpiece may rotate, said second location being the point of contact of said workpiece and said rotatable wheel.

15. A device for checking the concentricity of a cylindrical workpiece, comprising:

a frame;

a first bearing support rotatably mounted on said frame for supporting said workpiece at a position under said workpiece, the intersection of said first bearing support and said workpiece defining a first tangent;

a second bearing support rotatably mounted on said frame for supporting said workpiece at a position on one side of said workpiece, said workpiece thereby being allowed to rotate freely on said first and second bearing supports, the intersection of said second bearing support and said workpiece defining a second tangent orthogonal to said first tangent, said first and second bearing supports locating said cylindrical workpiece geometrically in a reference position to allow a measurement of the diameter of said workpiece to be made between said first bearing support and the location opposite the intersection of said first bearing support and said workpiece, said diameter being measured as said workpiece is rotated on said first and second bearing supports to check the concentricity of said workpiece; and biasing means for maintaining said workpiece in contact with said first and second bearing supports.

16. A device as defined in claim 15, wherein said first bearing support comprises:

an axle mounted on said frame;

a first bearing wheel rotatably mounted on said axle to support said workpiece adjacent one end of said workpiece, said measurement of diameter being referenced from the point of intersection of said first bearing wheel with said workpiece; and a second bearing wheel rotatably mounted on said axle to support said workpiece adjacent the other end of said workpiece.

17. A device as defined in claim 15, wherein said biasing means comprises:

a support structure mounted on said frame in a hinged fashion for movement relative to said frame;

an axle mounted on said support structure;

at least one bearing wheel mounted on said axle; and means for urging said bearing wheel into contact with said workpiece to cause said workpiece to remain in contact with said first and second bearing supports.

18. A device as defined in claim 17, wherein said urging means comprises:

at least one elastic band connected between said frame and said support structure.

19. A device for checking the concentricity of a cylindrical workpiece, comprising:

a frame;

lower support means mounted on said frame for rotatably supporting said workpiece at a first location on the exterior perimeter of said workpiece, said first location defining a first tangent;

side support means mounted on said frame for rotatably supporting said workpiece at a second location on the exterior perimeter of said workpiece, said second location defining a second tangent orthogonal to said first tangent;

biasing means for retaining said workpiece on said first and second support means; and indicator means for measuring the diameter of said workpiece at a third location on the exterior of said workpiece opposite said first location, the diameter of said workpiece being measured between said first location and said third location while said workpiece is rotated.

20. A device as defined in claim 19, wherein said lower support means comprises:

an axle mounted on said frame;

a first bearing wheel rotatably mounted on said axle to support said workpiece at one end of said workpiece;

a second bearing wheel rotatably mounted on said axle to support said workpiece at the other end of said workpiece.

21. A device as defined in claim 20, wherein said first location which is the reference point for measuring the diameter of said workpiece is the intersection of said first bearing wheel with said workpiece at said one end of said workpiece.

22. A device for checking the concentricity of a cylindrical workpiece, comprising:

a lower frame member;

a lower bearing support for locating and carrying said cylindrical workpiece;

a side frame member;

a side bearing support for carrying said cylindrical workpiece at a location 90° from said lower bearing support; and means for retaining said workpiece in contact with said lower and side bearing supports while said workpiece is rotated to check concentricity thereof at a location on said workpiece opposite said lower bearing support.

23. A method of checking concentricity in a cylindrical workpiece, comprising:

supporting said workpiece on a first bearing;

establishing a reference point from which the diameter of said workpiece may be monitored;

maintaining said workpiece on said first bearing by using a second bearing to orient said workpiece on said first bearing, said second bearing contacting said workpiece at a location defining a tangent orthogonal to the tangent defined by the point at which said first bearing contacts said workpiece;

biasing said workpiece to maintain said workpiece in contact with said first and second bearings;

rotating said workpiece on said first and second bearings; and monitoring the diameter of said workpiece with respect to said reference point as said workpiece is rotated to check the concentricity of said workpiece.

24. A method as defined in claim 23, wherein said first bearing supports said workpiece adjacent to one end of said workpiece, and the diameter of said workpiece is monitored at said one end of said workpiece.

25. A method as defined in claim 23, wherein said reference point is the point at which said first bearing contacts said workpiece.

26. A method as defined in claim 25, wherein said establishing step comprises:

determining the relative location of said reference point with respect to a fixed reference surface.

27. A method as defined in claim 26, wherein said monitoring step comprises:

determining the relative location of the point on said workpiece opposite said reference point with respect to said fixed reference surface; and subtracting said relative location of said reference point from said relative location of said point on said workpiece opposite said reference point.

28. A method as defined in claim 23, wherein said monitoring step is performed using a dial indicator to measure change in diameter as said workpiece is rotated.

29. A method of determining concentricity of a cylindrical workpiece, comprising:

rotatably supporting said workpiece on bearings contacting said workpiece at two points on the exterior surface of said workpiece, said two points defining orthogonal tangents to said workpiece;

measuring the diameter of said workpiece at a location on the opposite side of the exterior surface of said workpiece to one of said two points, while simultaneously rotating said workpiece to ascertain the concentricity of said workpiece.

30. A method of checking the concentricity of a cylindrical workpiece comprising:

supporting said workpiece for rotation at a first location on the outer perimeter of said workpiece adjacent one end of said workpiece;

supporting said workpiece for rotation at a second location on the outer perimeter of said workpiece, said second location being 90° from said first location;

measuring the outer diameter of said workpiece at a third location on the outer perimeter of said workpiece adjacent said one end of said workpiece, said third location being 180° from said first location; and rotating said workpiece to check for differing diameters around the perimeter of said workpiece at said one end of said workpiece.

31. A holding fixture for rotatably supporting a thin-walled cylindrical workpiece so that measurements of concentricity can be made comprising:

a base plate providing a first horizontal reference plane along the upper surface thereof;

an upright plate rigidly mounted to the base plate at right angles thereto and defining a vertical reference plane along a surface adjacent the base plate;

a pair of end supports mounted to opposite edges of the base plate and extending above the horizontal reference plane;

a first axle removably mounted between said end supports and extending along the horizontal reference plane in contact therewith;

a pair of support rollers mounted for rotation on said axle adjacent opposite ends thereof;

a pair of recesses in the base plate situated to receive the portions of the support rollers extending below the axle;

a second axle mounted in a fixed position in contact with the vertical reference plane and carrying a support roller thereon approximately midway between opposed edges of the upright plate, the first and second axles being positioned so that their centers lie on two orthogonal diameters of the workpiece when a workpiece is positioned on the fixture, the support roller on the second axle being partially received within a recess in the upright plate along the vertical reference plane surface; and a hinged plate pivotably connected to the base plate along an edge remote from the upright plate, the hinged plate having a shaft supporting a pair of guide rollers for urging the workpiece against the support rollers of the first and second axles as the workpiece is rotated thereon.

32. The device of claim 31 further including biasing means for biasing the hinged plate toward the upright plate.

33. The device of claim 32 wherein the biasing means comprises an elastic band for coupling between a pin affixed to the upright plate and an extension of the shaft of the hinged plate.

34. The device of claim 33 wherein the shaft of the hinged plate, when the hinged plate is biased toward the upright plate with a workpiece in position on the fixture, is located above a horizontal plane extending through the axis of the second roller in order to apply a force urging the workpiece into contact with the first and second support rollers.

35. The device of claim 31 further including a pair of guide elements, one for each end of the workpiece, releasably mounted in the base plate and extending upright from the horizontal reference plane surface.

36. The device of claim 35 further including means for releasably mounting the guide pins at different positions in the horizontal reference plane surface to accommodate workpieces of different lengths.

37. The device of claim 31 further including spacing means mounted along opposite ends of the first axle and extending into the recesses in the horizontal reference plane surface to affix the support rollers in respective selected positions on the first axle.

38. The device of claim 31 further including a removable bracket affixed to the base plate for retaining the first axle in contact with the horizontal reference plane surface.

39. The device of claim 38 further including auxiliary axle retaining means positioned near the intersection of the base plate and the upright plate for storing an alternative axle with support rollers and spacing means thereon, said support rollers being spaced differently from the support rollers of the first axle in order to accommodate workpieces of different lengths when the alternative axle is substituted for the first axle in position against the horizontal reference surface of the base plate.

* * * * *